United States Patent [19]
Mosterd

[11] 3,792,784
[45] Feb. 19, 1974

[54] DEVICE FOR HANDLING EGG TRAYS

[76] Inventor: Jacob H. Mosterd, Stationsweg 117, Barneveld, Netherlands

[22] Filed: May 24, 1972

[21] Appl. No.: 256,335

[30] Foreign Application Priority Data
June 9, 1971 Netherlands.................. 7107931

[52] U.S. Cl................ 214/6 H, 214/1 BD, 214/6.5, 214/6 DK, 214/DIG. 10, 214/8.5 C, 214/8.5 A
[51] Int. Cl........................................... B65g 57/06
[58] Field of Search. 214/6.5, 6 N, 6 M, 6 H, 6 DK, 214/6 P, 6 A, 6 S, 6 BA, 6 FS, 8.5 R, 8.5 A, 8.5 C, 8.5 D, 8.5 F

[56] References Cited
UNITED STATES PATENTS

| | | | |
|---|---|---|---|
| 2,579,094 | 12/1951 | Rooksby............................ | 214/6 FS |
| 2,565,927 | 8/1951 | Morgan.............................. | 214/6 H |
| 3,637,093 | 1/1972 | Brockmuller et al................ | 214/6 P |
| 2,697,388 | 12/1954 | Hansen et al........................ | 214/6.5 |
| 3,617,054 | 11/1971 | Schilling............................ | 214/6 DK |
| 3,366,253 | 1/1968 | Walchhuter........................ | 214/6 DK |
| 3,633,652 | 1/1972 | Chambran........................... | 214/6 H |
| 3,659,728 | 5/1972 | Reinecke............................ | 214/6 H |
| 3,312,357 | 4/1967 | Stephens et al.................... | 214/6 DK |

*Primary Examiner*—Robert J. Spar
*Attorney, Agent, or Firm*—Larson, Taylor & Hinds

[57] ABSTRACT

The invention provides a device for automatically removing egg-trays from a stack, in which each tray is rotated about 90° with respect to the preceding tray, the device containing a support that is vertically movable and rotatable about a vertical axis such that a predetermined vertical displacement equalling the vertical distance between two successive trays in the stack corresponds to a rotation of about 90°, and a gripper for removing the uppermost tray from the stack. The device can also be used for forming a stack of trays as described.

4 Claims, 4 Drawing Figures

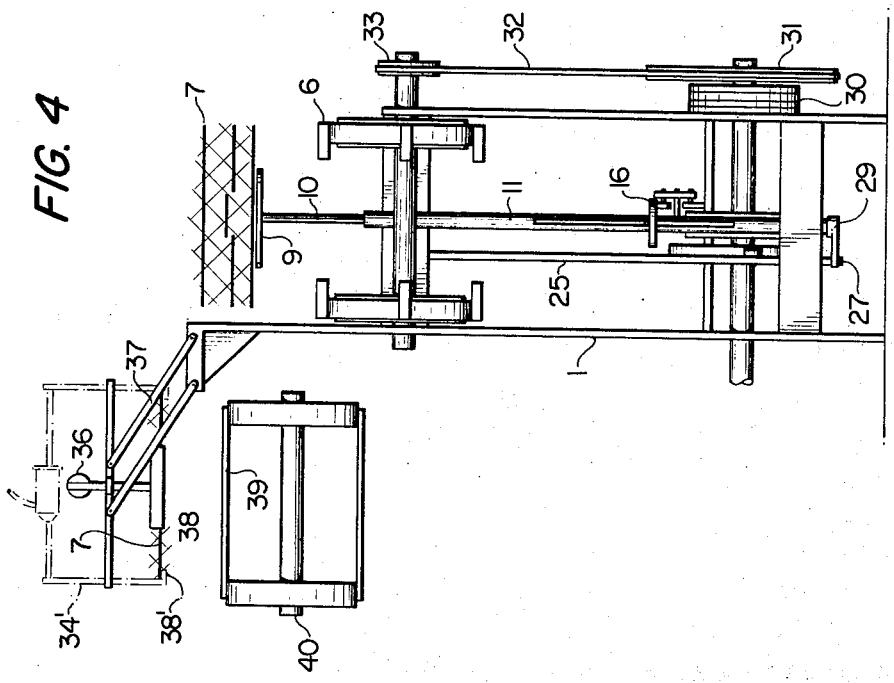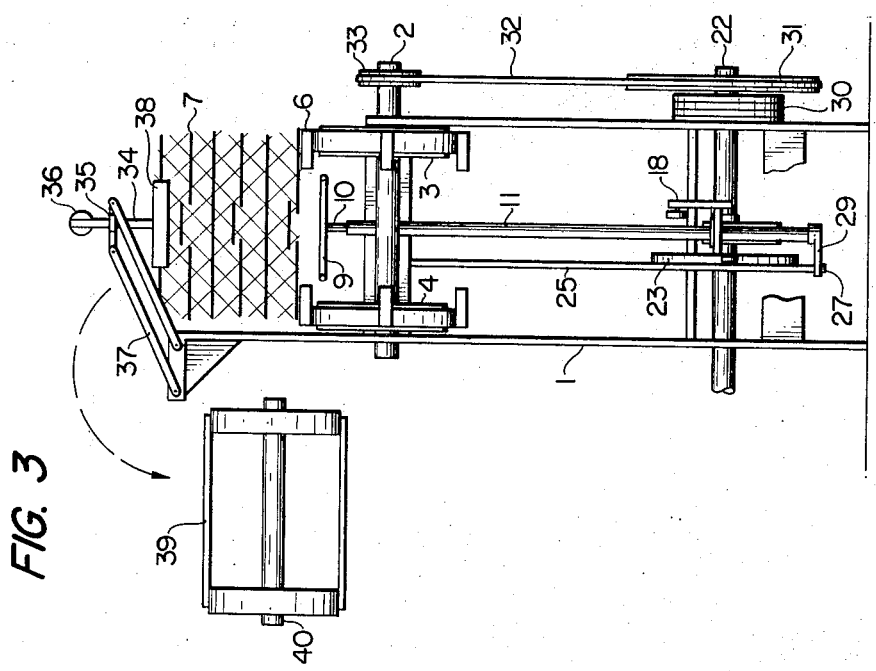

DEVICE FOR HANDLING EGG TRAYS

For the transporation of eggs normalized egg-trays, which can contain five rows of six eggs, are widely used. Said trays have been adapted such that, after being filled with eggs, they can be stacked on each other, successively superposed trays having been rotated over 90°. A stack of egg-trays of this type usually is transported in a so-called box-case, in which two stacks of six trays may be present.

When handling the trays from the box-case or placing the trays in the box-case respectively a considerable part of the work consists either of taking the stack of trays to pieces or of forming the stack of trays respectively, with which the trays have to be rotated. So it is e.g. necessary with egg sorting machines, with which the trays come from the box-cases, to grip said trays one by one, to rotate each second one over 90° and to place them on a conveying device, e.g. a conveyor-belt. This requires relatively much man-power and may, owing to the bending of the trays, cause damage to the eggs present thereon.

Also when removing the egg-trays, e.g. after they have been passed through an automatic egg-sorting device, it again is necessary to stack the trays on each other and to rotate each second one of them over 90°.

The invention aims at providing a simple device, enabling on the one hand the removal of trays from a stack of trays for supplying them to e.g. an egg-sorting machine and on the other hand to automatically stack trays that have homologously been supplied on each other to stacks of the type as described.

The above mentioned aims are attained according to the invention by means of a support for a tray, which has been adapted to carry out a vertical movement along the difference in height between two trays that have been stacked on each other as well as a rotation about a vertical axis over 90°, and a tray-gripper, which has been adapted to move a tray between a location situated at a permanent height above the support and a conveying device.

A simple embodiment of the support is obtained by, according to a further elaboration of the invention, having the support carried by a rotatable and axially shiftable shaft.

When applying the invention it is of importance, that a number of stacks can be formed beforehand or that a device for carrying away the formed stacks is present. A simple solution consists in a conveyor belt for stacks. Herewith, however, the difficulty arises, that the supporting device must be able to work from the underside through the conveyor belt. An additional complication therewith is, that normally a conveyor-belt for the horizontal transportation has a feed-back belt portion positioned below the belt portion working as a conveyor. This means, that no disturbance may occur either between the supporting device and this piece of the conveyor belt running at the lower side.

According to a further elaboration of the invention all difficulties in this respect are avoided and consequently the freedom is obtained to use a conveyor-belt having a portion running below the conveyor portion by employing a conveyor belt for egg-trays, which is open in its center portion and at its edges is provided with raised portions, fitting into recesses of the underside of the egg-trays.

A simple embodiment of the invention consists in that the rotation over 90° is carried out to and fro. Therewith it is possible to derive said rotational movement from a cam, which preferably has been coupled with another cam, causing the vertical movement of the supporting device.

In the following the invention is further elucidated by means of the drawings, in which:

FIG. 1 schematically shows a view of a device according to the invention;

FIG. 3 is an end view in a first position; and

FIG. 4 is an end view corresponding with FIG. 3 in a second position.

Figure 1:
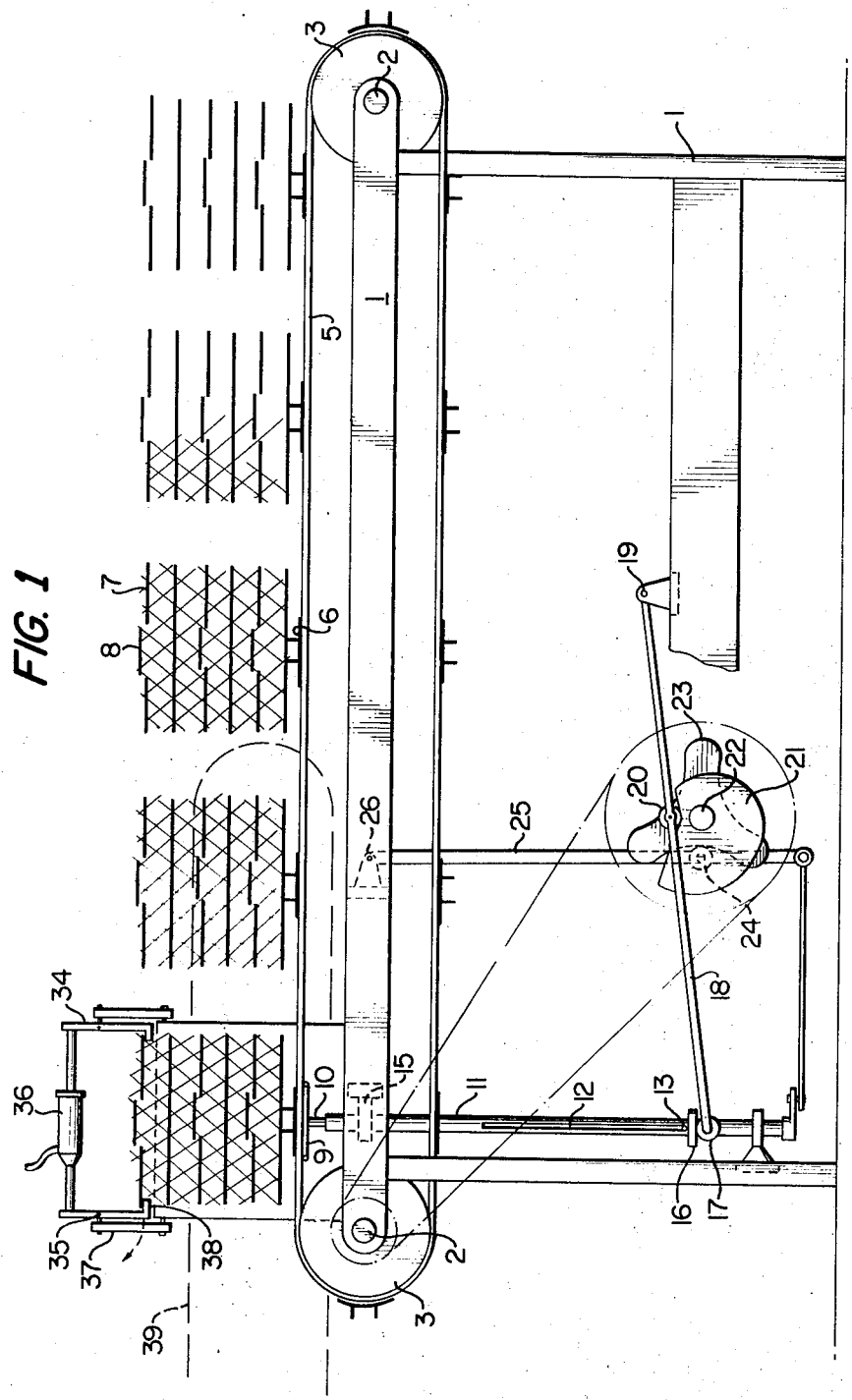
Figure 2:
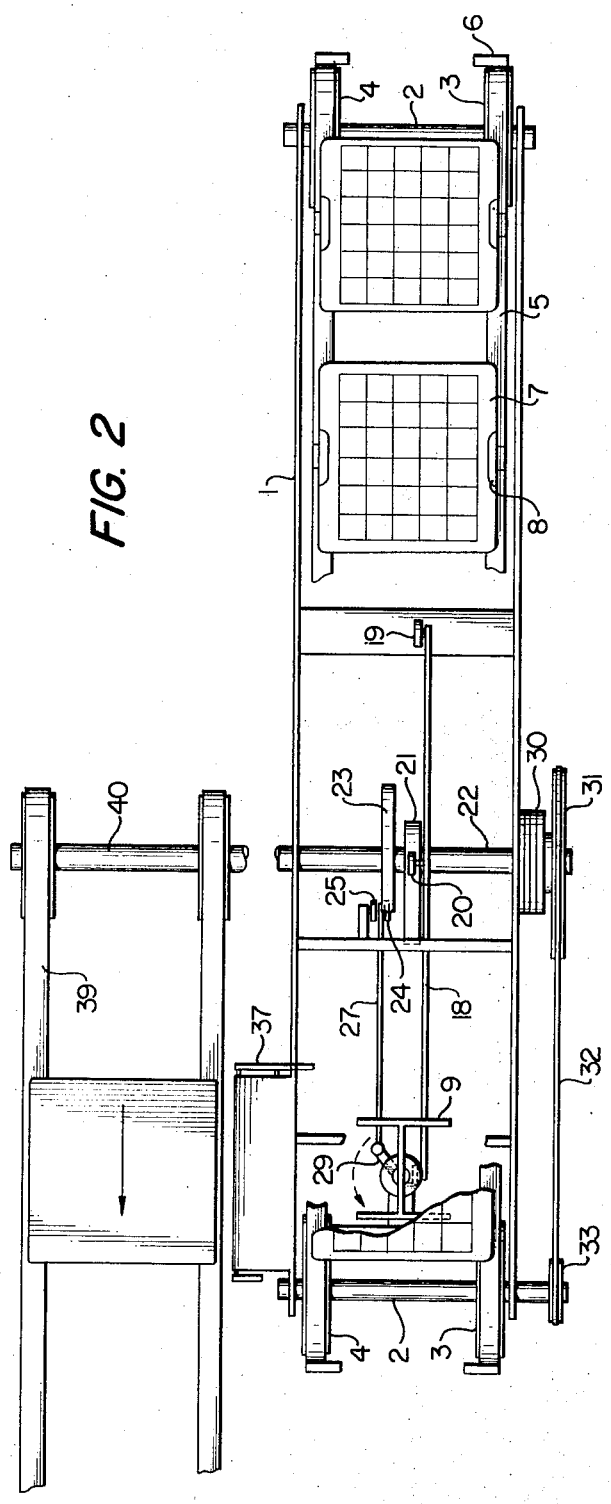
FIG. 2 is a top view of the device according to FIG. 1.

In FIG. 1 by 1 a frame has been indicated, bearing shafts 2 for discs 3. As more particularly appears from FIG. 2 further discs 4 are present on the same shafts 2. On each pair of discs 3, 4 respectively a conveyor-belt 5 is running, which at regular mutual distances is provided with an index member 6. The construction is such, that two index members 6 of the two belts 5 always are directly opposite each other. Furthermore the index members 6 are shaped such, that they can easily take an egg-tray in a first orientation, but on the contrary not when the tray has been rotated over 90°. The position in which the trays are easily taken is the one, in which the rows of six are parallel with the shaft 2. In FIG. 2 the uppermost tray of six trays 7 is visible, said tray having been rotated over 90° with respect to the lowermost one. The position of the trays 7 in the drawing can always easily be derived from handles 8.

A support 9 is borne by a rod 10, mounted in a sleeve 11, said sleeve being provided with a slot 12 through which a pin 13 protrudes, said pin being fixedly connected with rod 10. Sleeve 11 is rotatable in bearings 14 and 15, but it is not axially displaceable. Below pin 13 a supporting plate 16, which can shift over sleeve 11, is mounted. Plate 16 is borne by a roll 17, which has been attached to a lever 18. Lever 18 is on the one hand supported in a fixed pivot 19 and on the other hand by a cam follower roll 20, resting on a cam 21. Said cam is fixedly mounted on a shaft 22. On said same shaft a further cam 23 cooperating with a follower roll 24, is mounted. Said roll is rotatably supported by a lever 25, which has pivotably been connected to a pivot 26 and at its lower side bears a link 27, which via a pivot 28 has been connected to a swivel arm 29 of sleeve 11. On shaft 22 furthermore a clutch 30, which is known in itself, is present, said clutch 30 being adapted to take along a sprocket wheel 31 along a predetermined part of a revolution of shaft 22. Sprocket wheel 31 has via a chain 32 been coupled with a sprocket wheel 33, which has fixedly been connected to a shaft 2, on which discs 3 and 4 have fixedly been connected. The distance along which clutch 30 is driving sprocket wheel 31 with each revolution of shaft 22 is sufficient for shifting belts 5 along the distance between the centers of two successive members 6.

Furthermore a tray-gripper is present, comprising a pair of arms 34, which can rotate about centres of rotation 35 and at their upper sides via a pneumatic prime mover 36 have been interconnected. The centres of rotation 35 are borne by parallelogram frames 37, which can be driven by means (not shown) from the position of FIG. 3, via that of FIG. 4, to an end position, in which a tray is present immediately above a conveyor-belt 39 and vice versa. In interrupted lines in FIG. 4 a second pair of arms 34' have been indicated, which are also supported by the parallelogram frames 37 and for the rest completely work like the pair of arms 34. Operating the prime mover 36 can cause the gripping edges 38 mounted to the lower side of the arms 34 to grip or not to grip under the outer edge of a tray 7. The working of said tray-gripper is as follows:

In the position of FIG. 3 operation of prime mover 36, as has been indicated in FIG. 1, causes the gripping edges 38 to grip under the edges of the uppermost tray of a stack of trays. The second pair of arms 34' therewith also support two edges of the tray, so that arms 34 and 34' four-sidedly support the tray by which cracking is prevented. In this position the parallelogram frames 37 are swung from the position of FIG. 3 via the position of FIG. 4, into a position (not shown) in which tray 7 almost contacts conveyor-belt 39, after which by a new operation of the prime mover 36 the gripping edges 38 are moved away from each other and the tray is placed on the continuously moving conveyor-belt 39.

The working of the device as described for handling a stack of trays is as follows:

The stacks of trays are placed on the members 6 of the belts 5. Shaft 22 is continuously driven. This means, that starting from the position indicated in FIG. 1 the cam 21 is rotated such that lever 18 and owing to this roll 17 is moved upwardly. When roll 17 moves upwardly it takes along plate 16 and this plate, via pin 13, takes along rod 10 by which support 9 moves upwardly. Because cam 23 is fixedly mounted with shaft 22 said cam is also rotated. Therewith it moves follower roll 24 to and fro, which follower roll via the rod transmission 25, 27 causes swivel arm 29 to move to and fro. The result is that every time the support 9 has been moved upwardly along the vertical distance of two egg-trays 7 which have stacked on each other a rotational movement of 90° is carried out by the support 9. Therewith whenever this movement has been finished the tray-gripper is put into operation for removing the uppermost tray, which thereupon is supplied to conveyor 39. Said conveyor is continuously driven for which purpose e.g. a non-shown transmission can serve between shaft 22 and shaft 40 of conveyor 39. After the lowermost tray 7 has come upwardly so far, that it is gripped by edges 38 and removed, cam 23 comes into the strongly receding portion 41, by which support 9 quickly descends. Immediately thereupon rotation of the sprocket wheel 31 is started by clutch 30 and consequently the conveyor belts 5 shift along the distance between two members 6. When another stack of trays arrives at the location of the support 9 the latter is in a sufficiently low position to allow the passage of the stack till it reaches the position shown in FIG. 1 for the stack most to the left. The members 6 naturally have only schematically been shown, but they have been shaped in a way known in itself such that they can only cooperate with an egg-tray in the position in which the five rows of six egg recesses are parallel with shaft 2.

It will be clear that the same device can be used for stacking the egg-trays, arriving on the conveyor 39. Said trays can be gripped by the gripping device 34-38. The first tray is placed on the support when the support 9 is in its uppermost position. Then support 9 is rotated over 90° and lowered one step, after which the second tray is deposited on the first one and so on till six trays have been placed on it, and it reaches the position shown in FIG. 3. Thereupon conveyor 9 can move a step fartheron removing the stack of egg-trays formed in this way.

The relatively simple device according to the invention gives the possibility of coming to a considerable saving of man-power. An additional advantage is, that, when applying the invention, it is not possible to place the trays on the conveyor belt in the wrong position and that, moreover, the trays, taken from a stack, are always in the correct position. When accidentally too small a number of trays is present on a stack, e.g. five, the consequence is, that no tray is taken with the first handling, and that thereupon, thus after a rotation over 90°, the next tray in the correct position is taken.

What I claim is:

1. A device for stacking or unstacking egg-trays comprising a vertically movable and horizontally rotatable support for a tray, first means for vertically moving the support and second means for rotating it, said first and second means being coupled such that movement of the support along a predetermined vertical distance in at least one predetermined sense, which distance equals the height difference of two trays stacked on each other, corresponds to rotation of 90° of the support, said first and second means containing two rotational cams, one of which controls the height position of the support and the second of which controls the angular position of said support, said cams being mechanically coupled to each other, a first horizontal conveying device that is open in its centre region and is adapted to support a stack of trays in a predetermined directional position, said first means passing through said open centre region, a second horizontal conveying device and a tray gripper pivotably mounted on the free ends of a vertically swingable linkage arm system adapted to move a tray between a first fixed location, situated above said first conveying device and in vertical alignment with said support, and a laterally spaced second location sitututed on said second horizontal conveying device.

2. A device according to claim 1, in which said conveying devices contain conveyor belts, that are open in their centres and at their edges are provided with raised portions adapted to fit into recesses of the lower side of egg-trays.

3. A device according to claim 1, provided with means for intermittently driving said first conveying device, said means being coupled to the said first and second means for moving the support such that the first conveying device is moved along a predetermined distance, when the support a predetermined number of times is vertically moved and rotated over 90°, said predetermined number being equal to the number of vertical steps the support can carry out.

4. A device according to claim 1, in which the tray gripper is provided with means to foursidedly support the trays.

* * * * *